United States Patent [19]

Kolodchin et al.

[11] 4,454,270

[45] Jun. 12, 1984

[54] METHOD AND COMPOSITION FOR PREVENTING OR SUPPRESSING DISCOLORATION IN POLYOLEFINS

[75] Inventors: William Kolodchin; Kestutis A. Keblys, both of Baton Rouge, La.

[73] Assignee: Ethyl Corporation, Richmond, Va.

[21] Appl. No.: 363,668

[22] Filed: Mar. 31, 1982

Related U.S. Application Data

[63] Continuation-in-part of Ser. No. 330,274, Dec. 14, 1981, abandoned.

[51] Int. Cl.³ .......................... C08K 5/34; C08K 5/13; C08K 5/10
[52] U.S. Cl. ..................................... 524/102; 524/101; 524/249; 524/342; 524/406; 524/413
[58] Field of Search ............... 524/102, 249, 342, 101, 524/406, 413

[56] References Cited

U.S. PATENT DOCUMENTS

| | | | |
|---|---|---|---|
| 2,287,188 | 6/1942 | Matheson et al. | 524/249 |
| 3,349,059 | 10/1967 | Lappin | 524/238 |
| 3,389,119 | 6/1968 | Sherrill | 524/247 |
| 3,531,483 | 9/1970 | Gilles | 544/221 |
| 3,773,743 | 11/1973 | Ainsworth et al. | 524/249 |
| 3,803,065 | 4/1974 | Arai et al. | 523/205 |
| 3,922,249 | 11/1975 | Mills | 524/120 |

*Primary Examiner*—John Kight, III
*Assistant Examiner*—Kriellion Morgan
*Attorney, Agent, or Firm*—Donald L. Johnson; John F. Sieberth; John F. Hunt

[57] ABSTRACT

Various antioxidant-protected polyolefins are protected against initial discoloration from processing, subsequent discoloration, loss of whiteness, and yellowing with time and upon exposure to elevated temperature by addition of various compounds such as triisopropanolamine, bipyridines, and N,N-bis-(2-hydroxymethyl)-soyaamine.

21 Claims, No Drawings

METHOD AND COMPOSITION FOR PREVENTING OR SUPPRESSING DISCOLORATION IN POLYOLEFINS

CROSS REFERENCE TO RELATED APPLICATION

This application is a continuation-in-part of application Ser. No. 330,274, filed Dec. 14, 1981, now abandoned.

BACKGROUND OF THE INVENTION

1. Field of the Invention

This invention relates to the prevention and/or suppression of discoloration in polyolefins protected by antioxidants as well as the materials and method therefor.

2. Description of the Prior Art

Various polyolefins are commercially available and have found numerous uses. The most commonly used polyolefins for various commercial products are polypropylene, high density polyethylene, low density polyethylene, linear low density polyethylene, and polybutylene. Articles of manufacture made from such polyolefins are made by extrusion molding, injection molding, blow molding, film extrusion and other methods of resin processing. During such processing the polyolefin resins are subjected to elevated tempertures. The elevated temperatures noted here are high enough to affect the rigidity of the polyolefin, but generally are kept below the decomposition point of the polymer.

Some examples of commercial polyolefins include:
(1) polypropylene, such as Profax 6501 (TM, Hercules Powder, Inc.), Dypro (TM, ARCO Chemical Co.);
(2) high density polyethylene, such as Marlex (TM, Phillips Chemical Co.);
(3) low density polyethylene, such as Norchem NPE 420 (TM, Northern Petrochemicals Co.);
(4) linear low density polyethylene (LLDPE), such as Dowlex 2252 (TM, Dow Chemical Co.); LPX-2 and LPX-7 (TM's, Exxon Corp.) and Union Carbide UCC-1055 (TM); and
(5) polybutylene from Witco Chemical Co.

The polyolefins mentioned above are used in making both flexible and rigid plastic products including toys, office materials, containers, home products, cable coatings, film, fibers, and other articles used in industry.

The polyolefins mentioned above ordinarily require antioxidant protection to avoid molecular degradation or other deterioration associated with exposure to air and elevated temperatures. For example, unstabilized Profax 6501 polypropylene "falls" in oven testing at 150° C. after only about 3-4 hours. However, addition to the Profax 6501 polypropylene of any of the various known and commercially used antioxidants extends the life of this polyolefin significantly. For example, the combination of 1,3,5-trimethyl-2,4,6-tris (3',5'-di-tert-butyl-4'-hydroxybenzyl)benzene marketed by Ethyl Corporation as Ethanox®330 antioxidant with the polypropylene extends the lifetime in oven aging at 150° C. to greater than 1,000 hours.

The history of polyolefin production includes a progression of catalyst systems and post-polymerization recovery techniques which affect the purity of the bulk polyolefin. In the 1960's and 1970's a slurry process such as that of Phillips Petroleum Company was used. The slurry process required a catalyst separation step which, although it was more effective for recovering catalyst than today's methods, was nevertheless quite costly in terms of handling, catalyst losses, and solvent costs for the separation. Such a process is described and compared to newer processes in the *Chemical Economics Handbook*, SRI International, Plastics and Resins, 580.1342 A, August, 1981. *The Encyclopedia of Polymer Technology*, Volume II (1981) at page 282 also compares the Phillips' slurry process with the (relatively) new Ziegler process. At page 605, the post-polymerization purification of propylene is discussed. Therein it is noted that residual metals remain in the polymer product.

Another example of the Phillips' slurry technique is U.S. Pat. No. 2,825,721 to Hogan et al (1958). Again in Phillips' U.S. Pat. No. 3,502,634 (1970) to Stedefeder et al, the slurry process is disclosed where 5000 parts methanol wash are used for 1.25 parts titanium trichloride catalyst.

In Phillips' U.S. Pat. No. 3,922,249 (1975) it is disclosed that N,N-bis(hydroxyalkyl)-N-alkylamines used as antistatic agents cause discoloration in polyolefins produced by the slurry method. The amines include, for example, Armour Industrial Chemical Company's Armostat 310, N,N-bis(2-hydroxyethyl)-N-octadecylamine.

Discoloration by the listed amines was known and the invention disclosed in the U.S. Pat. No. 3,922,249 patent was the use of certain phosphites to correct discoloration caused by the antistatic agents.

Most large volume polyolefins including high density polyethylene, low density polyethylene, linear low density polyethylene, polybutylene, polypropylene and the like are now produced by processes using metal-containing catalysts wherein trace amounts of the catalyst metals are not recovered but remain in the polymer.

While all of the effects of catalyst trace metals in polymers are not known, it is known that most polymers produced today, especially those relatively "dirty," high volume polymers for general purpose grade applications tend to discolor with the addition of effective amounts of various types of antioxidants. Of course without the antioxidants, the service life of the polymer product is extremely short.

Color is a significant problem with combinations of polyolefin and antioxidant. While this problem may be viewed as merely an aesthetic one, it is nevertheless significant. Articles of manufacture made from antioxidant-protected polyolefins must in many cases have an initial white or transparent color and maintain such color in order to be suitable for commercialization.

Special problems may be presented for containers and other articles of manufacture wherein a standard white color is necessary for production of a finished product and/or before modification to a different color.

Some of the polyolefin and antioxidant combinations evidence a greater degree of discoloration than others. Furthermore, the degree of initial discoloration and further discoloration with time varies not only according to the amount of antioxidant present, but also with the particular type of polyolefin used, the number of extrusion passes, the severity of processing, and the presence of contaminants.

Various nitrogen-containing materials are known in the prior art for purposes associated with resins and the like. For example, U.S. Pat. No. 3,553,298 to Hodan et al lists various amines, heterocyclic alkyls, and other nitrogen-containing compounds for combination with phosphite esters. The disclosure of the Hodan et al patent is directed toward such a combination for the purpose of stabilizing the phosphite ester against hydrolysis in a manner more advantageous than the materials used theretofore. Such amines have also found use in distillate fuels.

SUMMARY OF THE INVENTION

The present invention is a composition of matter comprising a major portion of polyolefin, a minor portion of antioxidant protecting said polyolefin, wherein the polyolefin contains small amounts of catalyst metal contaminants causing discoloration in combination with a phenolic antioxidant in said polyolefin; and a compound selected from the group consisting of bipyridines, and amines of structure I:

wherein at least one of $R_1$, $R_2$, and $R_3$ is alkanol and nonselected R's are independently hydrogen, alkyl, or alkenyl present in an amount effective to suppress and/or prevent discoloration of the antioxidant protected polyolefin. The nonselected R's are often long chain unsaturated alkenyl radicals or compositions with mixtures thereof. For example a soyaamine may have both $C_{18}H_{35}$- and $C_{18}H_{36}$-amines. The result of the invention is totally unexpected since some of the inhibiting compounds are the same compounds which were known to cause yellowing and other discoloration in polyolefins made by processes which leave the polymer in a substantially pure state.

The present invention is also a composition of matter comprising about 1.0 part by weight phenolic antioxidant and about 0.025 to 1.0 part by weight of a compound selected from the group consisting of bipyridines and trialkanolamines.

The present invention is also a method of preventing and/or suppressing discoloration in an antioxidant-protected, catalyst-contaminated polyolefin, comprising admixing with said polyolefin a compound selected from the group consisting of bipyridines and amines of structure I in an amount effective to suppress and/or prevent discoloration of the antioxidant-protected polyolefin.

The invention also includes items of manufacture made from the compositions of or by the method of the invention.

Finally, the present invention is also a method of preventing or suppressing yellowness in a polyolefin otherwise tending to discolor with the addition of a protective antioxidant amount of 1,3,5-trimethyl-2,4,6-tris(3',5'-di-tert-butyl-4'-hydroxybenzyl)benzene, said method comprising also adding to said polyolefin a portion of triisopropanolamine, bipyridine, or N,N-bis-(2-hydroxyethyl)-soyaamine, sufficient to prevent or suppress discoloration of the protected polyolefin initially, with the passage of time, and upon exposure to elevated temperatures or air.

The invention includes the polyolefin-antioxidant additive compositions, antioxidant-amine compositions, and various inventive methods of admixing the ingredients and protecting polyolefins. The inventive antioxidant-additive compositions may be admixed with the polyolefin in the same manner known in the art for dispersing or mixing the antioxidant in a polyolefin. Alternatively, an antioxidant-protected polyolefin may be re-extruded with a discoloration inhibitor compound of the invention or mixtures thereof.

Other commercially used antioxidants and polyolefins may also be used with the compositions and methods of the present invention. It is known that various amines such as triisopropanolamine and bipyridine increase the basicity of a substrate. It is also known that an increase in basicity is usually associated with an increase in discoloration, especially in neat antioxidants. Thus, the method and compositions of the present invention are especially unobvious since contrary to expected results, discoloration in polyolefins is improved by addition of the specified agents. That is, the color of an antioxidant-protected polyolefin is both initially improved and subsequently better maintained with the addition of a discoloration-preventing or suppressing amount of the additive compounds of this invention.

Various antioxidants suitable for the invention are known and commercially used in the prior art and include 2,6-di-tert-butyl-p-cresol; 1,3,5-trimethyl-2,4,6-tris(3',5'-di-tert-butyl-4'-hydroxybenzyl)benzene; tris(3,5-di-tert-butyl-4-hydroxybenzyl)isocyanurate; and tetrakis (methylene-3-[3',5'-di-tert-butyl-4'-hydroxyphenyl]propionate)methane. These are marketed as BHT (butylated hydroxy tolune-generic term), Ethanox ® 330 from Ethyl Corporation, Goodrite 3114 (TM) from B. F. Goodrich Chemical Company, and Irganox ® 1010 from Ciba-Geigy Corporation. Other phenolic antioxidants include Ciba-Geigy's Irganox ®1076 and ICI's Topanol CA (TM). The formation of these antioxidants is well known in the prior art. For example, the second-mentioned compound may be formed according to the processes disclosed either in Rocklin U.S. Pat. No. 3,026,264 or Shin U.S. Pat. No. 3,025,488.

The antioxidants usable with the invention are those phenolic antioxidants mentioned above as well as others suitable to protect polyolefins.

The term polyolefin is intended to mean homopolymers and copolymers including polypropylene, polyethylene (high density), low density polyethylene, linear low density polyethylene (often made from a primary monomer and about 5–10% comonomer), polybutylene, polybutadiene, cis-poly-butadiene rubber, ethylene-propylene copolymers, and ethylene-propylenediene copolymers such as ethylene-propylene-cyclopentadiene, ethylene-propylene-1,4-cyclooctadiene, and the like.

The polyolefins of the invention are also those polyolefins which do not discolor, but rather improve in color with the addition of the inhibitors of the invention. Thus polymers excluded from the invention include the ethylene/1-butene copolymer (polyethylene) referred to in Examples II and IV of Phillips' U.S. Pat. No. 3,922,249 which were undoubtedly prepared by the Phillips' slurry, solvent-recovery method which takes out substantially all catalyst residue (at some expense). This is readily apparent since Table IV and Column 6, lines 33–36 of the examples show the increasing discoloration of the polymer with the addition of Armostat 310 (TM) amine, a compound which improves color in polyolefins of the invention.

The compounds suitable for suppressing, preventing, and/or inhibiting the development of yellowness or color according to the invention include the bipyridines:

 and 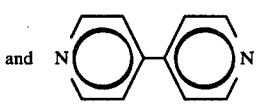

2,2'-bipyridyl      4,4'-bipyridyl

Substituted bipyridines are also suitable for the invention so long as the substituent functions do not interfere with suppression of coloration or otherwise adversely affect the protected polyolefin substrate.

Other compounds suitable for the invention are amines of structure I:

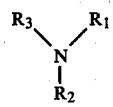   (I)

wherein at least one of $R_1$, $R_2$, and $R_3$ is alkanol and nonselected R's are independently hydrogen or alkyl. In the structure I compounds, the term alkanol is intended broadly as —R'—OH where —R'— is an alkylyl group that may be long, short, branched, or straight chain hydrocarbon, cycloalkylyl, or substituted variations thereof which do not adversely affect the invention. These compounds include triisopropanolamine, triethanolamine, tri-n-propanolamine and the like. Triisopropanolamine has the structure:

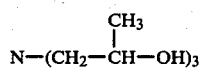

A more preferred class of compounds includes those amines of structure II:

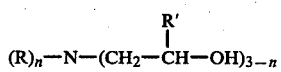   (II)

wherein n=0, 1, or 2; R and R' are H or alkyl. Alkyl is intended to mean long, short, straight, and branched-chain alkyls as well as cycloalkyls and substituted variations thereof so long as the substituents and structures do not adversely affect the invention. Such compounds have a hydroxy-carbon bond at the second carbon atom from the nitrogen nucleus. These compounds include the hydroxyalkyl alkylamines and dihydroxyalkyl alkylamines such as N,N-bis-(2-hydroxyethyl)soyaammine where R is $C_{18}H_{35}$—, R' is H, and n=1. Other such amines are included in the invention but those with short chain hydroxyalkyl groups are most preferred.

It is, therefore, an object of the present invention to provide a composition of antioxidant and discoloration suppressant/inhibitor for use in polyolefins otherwise susceptible to discoloration with antioxidant alone.

It is also an object of the present invention to provide a composition of matter including any of various polyolefins, antioxidants, and discoloration suppressors including triisopropanolamine, bipyridine, and N,N-bis-(2-hydroxyethyl)soyaamine.

It is also an object of the present invention to provide a method for preventing/suppressing discoloration in antioxidant-protected polyolefins.

These and other objects of the present invention will be better understood by referral to the following detailed description. A reading of the following description of the preferred embodiments will provide an understanding of how the present invention has overcome the polyolefin discoloration problems of the prior art by use of an unobvious material.

DESCRIPTION OF THE PREFERRED EMBODIMENTS

A preferred embodiment of the invention is a polyolefin protected by an antioxidant against long-term gradual degradation from oxidation and further protected against discoloration or loss of whiteness by a discoloration preventing/suppressing compound of the invention, which polyolefin has a catalyst metal residue as more fully explained below. It is theorized that the discoloration is caused by action of a combination of inhibitor and phenolic antioxidant rather than by one or the other alone. However, applicants do not wish to be bound by this theory.

TABLE A

|  | LLDPE general purpose film grade ppm | LLDPE ppm | LLDPE wire and cable grade ppm |
|---|---|---|---|
| titanium | 4.0 | 4.0 | 8.2 |
| aluminum | 57.0 | 45.0 | 0.1 |
| magnesium | 3.0 | 3.0 | 0.08 |
| silicon | 41.0 | 44.0 | — |

The polyolefins of the invention are made by processes including various metal-containing catalyst systems. Thus the polyolefins contain significant amounts of various metals. It has been found that the metals may affect either the polyolefin substrate or the phenolic antioxidant by some mechanism which causes or allows discoloration. Thus it is theorized that the color suppressants of the invention may tie up the metal contaminants in the manner of a chelating agent. Sample metal analyses from three polyolefins are given in Table A. On the other hand, where the polyolefin substrate has few contaminants, the phenolic antioxidants seem to discolor less and the addition of the inventive inhibitors does not help as much or for as long. In fact, after extensive oven aging, discoloration may be worse with inhibitors than without.

Other metals present at less than 1 ppm: Cr, Zn, Cu, Co, Cd, Mn, Mo, Na, Ni, Fe. Sometimes these and other metals are present in greater amounts depending upon catalyst base and post-polymerization recovery techniques.

Thus the polyolefins of the invention contain significant amounts of residual catalyst metal affecting discoloration, such as the first two columns in Table A. That is, such polyolefins are made by processes leaving significant amounts of residual catalyst metals therein and are thereby contaminated. Not included are those polyolefins such as the third column in Table A and those with similarly small or smaller amounts of residual catalyst metals.

Moreover the polyolefins of the invention are those which are protected against discoloration rather than increasingly discolored upon oven aging with the addition of the agents of this invention.

Some of the polyolefins tested below were also determined to contain additional small portions of other phenolic antioxidants which had been added during or shortly after polyolefin production. One phenolic antioxidant was octadecyl-β-(3,5-di-tert-butyl-4-hydroxyphenyl)propionate, marketed by Ciba-Geigy Corporation under the trademark Irganox®1076.

The polyolefin may also contain very small portions of agents for anti-slip, anti-block, anti-static and the like.

The additive discoloration inhibitors have not been found to detract from the antioxidant activity of the various phenolics used. That is, oxidative degradation by oven testing at 150° C. does not show an increase in molecular degradation with the additives.

The following examples serve to explain and distinguish the composition and method of the invention in the best mode now known to us.

EXAMPLE 1

Ethanox®330 phenolic antioxidant, 0.01 gram, and 0.01 gram triisopropanolamine (TIPA) were dissolved in 20 grams of reagent grade acetone. To this solution 20 grams of Exxon LPX-2 LLDPE was added and blended. The acetone was removed on a rotary evaporator. Thereafter, the stabilized LLDPE was compression molded at 300° F. in a Pasadena hydraulic press into several 2-inch by 4-inch plaques of about 60 mil thickness.

Yellowness index (YI) was measured by means of a Hunter Colorimeter D25D2 which measures yellowness of sample polyolefin plaques with light against a standard value. Negative and zero values are considered very good and aesthetically acceptable for plastic products. Positive numbers greater than about 5 are considered poor for many products requiring whiteness, translucence, etc.

The YI was measured before and after aging at both 70° C. and 90° C. in air-circulated aging ovens. Table 1 gives the YI of the discoloration-inhibited antioxidant-protected LLDPE of Example 1. For comparison, Table 1A gives the measured YI for similarly prepared plaques without discoloration inhibitor.

TABLE 1

| °C. | Hours | YI |
|---|---|---|
| 70 | 0 | −5.0 |
| 70 | 72 | −4.3 |
| 70 | 407 | 0.1 |
| 70 | 1000 | 5.7 |
| 90 | 0 | −4.0 |
| 90 | 72 | −1.5 |
| 90 | 408 | 2.0 |
| 90 | 1000 | 7.4 |

TABLE 1A

| °C. | Hours | YI |
|---|---|---|
| 70 | 0 | −4.0 |
| 70 | 100 | 0.3 |
| 70 | 288 | 5.6 |
| 70 | 500 | 11.5 |
| 70 | 1000 | 20.0 |
| 90 | 0 | −4.2 |
| 90 | 100 | 1.9 |
| 90 | 288 | 8.6 |
| 90 | 500 | 14.9 |
| 90 | 1000 | 24.5 |

EXAMPLE 2

This example demonstrates that some of the additive inhibitors of the invention actually tend to discolor rather than prevent discoloration in polyolefins not containing the trace catalyst metals of the polyolefins of the invention.

Following the procedure of Example 1, additional plaques were prepared from Exxon LPX-7 (TM) LLDPE and the amounts of additives indicated in Tables 2–5. The plaques were oven aged in air circulated ovens at 70° C. and 90° C.

Exxon's LPX-7 is an LLDPE for specialty grade applications such as wire coating. Catalyst metal contamination in LPX-7 LLDPE is low. The metals content is shown for this polyolefin as the third column in Table A above. No other metals above 1 ppm were detectable. As noted above, the discoloration of this polyolefin, while slightly improved at first, is worsened with oven aging when an inhibitor of the invention has been added.

TABLE 2

YELLOWNESS INDEX

| Additive | Wt. % | Hours of Oven Aging at 70° C. | | | | | | | |
|---|---|---|---|---|---|---|---|---|---|
| | | 0 | 24 | 100 | 168 | 288 | 432 | 500 | 1000 |
| Ethanox ® 330 | 0.1 | −4.8 | −3.1 | −1.8 | −0.5 | 1.1 | 4.4 | 5.0 | 9.2 |
| Ethanox ® 330 | 0.05 | −5.8 | −4.9 | −3.4 | −2.1 | −0.4 | 2.8 | 2.9 | 6.7 |
| Ethanox ® 330 / TIPA | 0.1 / 0.01 | −6.3 | −5.3 | −3.5 | −2.0 | 0.6 | 4.8 | 6.0 | 12.3 |
| Ethanox ® 330 / TIPA | 0.05 / 0.01 | −5.7 | −4.9 | −3.4 | −2.4 | −0.4 | 3.5 | 4.8 | 10.1 |

TABLE 3

YELLOWNESS INDEX

| Additive | Wt. % | Hours of Oven Aging at 90° C. | | | | | | | |
|---|---|---|---|---|---|---|---|---|---|
| | | 0 | 24 | 100 | 168 | 288 | 432 | 500 | 1000 |
| Ethanox ® 330 | 0.1 | −4.9 | −2.8 | 0.6 | 2.7 | 5.4 | 8.1 | 9.0 | 14.5 |
| Ethanox ® 330 | 0.05 | −6.0 | −4.4 | −1.4 | 0.5 | 2.8 | 4.8 | 5.5 | 9.2 |
| Ethanox ® 330 / TIPA | 0.1 / 0.01 | −6.1 | −5.2 | −2.0 | 1.2 | 6.5 | 13.5 | 14.5 | 21.5 |
| Ethanox ® 330 | 0.05 | −5.9 | −5.1 | −2.6 | −0.5 | 3.9 | 8.5 | 9.5 | 16.8 |

TABLE 3-continued

| | | YELLOWNESS INDEX | | | | | | | |
|---|---|---|---|---|---|---|---|---|---|
| | | Hours of Oven Aging at 90° C. | | | | | | | |
| Additive | Wt. % | 0 | 24 | 100 | 168 | 288 | 432 | 500 | 1000 |
| TIPA | 0.01 | | | | | | | | |

TABLE 4

| | | YELLOWNESS INDEX | | | | | | | |
|---|---|---|---|---|---|---|---|---|---|
| | | Hours of Oven Aging at 70° C. | | | | | | | |
| Additive | Wt. % | 0 | 24 | 100 | 168 | 288 | 432 | 500 | 1000 |
| Irganox ® 1010 | 0.1 | −5.4 | −4.3 | −3.0 | −2.3 | −1.0 | 0.6 | 1.6 | 4.5 |
| Irganox ® 1010<br>TIPA | 0.1<br>0.01 | −5.7 | −4.5 | −3.1 | −2.2 | −1.5 | 0.5 | 2.3 | 5.6 |

TABLE 5

| | | YELLOWNESS INDEX | | | | | | | |
|---|---|---|---|---|---|---|---|---|---|
| | | Hours of Oven Aging at 90° C. | | | | | | | |
| Additive | Wt. % | 0 | 24 | 100 | 168 | 288 | 432 | 500 | 1000 |
| Irganox ® 1010 | 0.1 | −5.6 | −4.1 | −2.0 | −0.9 | 0.6 | 2.1 | 2.9 | 5.0 |
| Irganox ® 1010<br>TIPA | 0.1<br>0.01 | −5.8 | −4.8 | −3.0 | −2.0 | −0.4 | 1.9 | 2.9 | 6.5 |

The results of Tables 2–5 are not surprising in view of the disclosure of Mills in U.S. Pat. No. 3,922,249.

The unexpected results of the invention are demonstrated in the examples below:

EXAMPLES 3–6

Following the procedure of Example 1, plaques were prepared from Exxon LPX-2 (TM) LLDPE with the amounts of additives indicated in Tables 6–9. The plaques were oven aged. Beneficial results are realized with a polyolefin containing significant amounts of catalyst residues.

TABLE 6

| | | YELLOWNESS INDEX | | | | | | |
|---|---|---|---|---|---|---|---|---|
| | | Hours of Oven Aging at 70° C. | | | | | | |
| Additive | Wt. % | 0 | 24 | 168 | 192 | 408 | 500 | 1000 |
| Ethanox ® 330 | 0.05 | −4.0 | −2.6 | 2.7 | — | — | 11.5 | 20.0 |
| Ethanox ® 330 | 0.10 | −3.9 | −2.6 | — | — | — | 13.2 | 23.0 |
| Ethanox ® 330<br>TIPA | 0.05<br>0.005 | −4.2 | −3.7 | — | −1.5 | 2.3 | 4.0 | 9.0 |
| Ethanox ® 330<br>TIPA | 0.05<br>0.01 | −4.8 | −4.5 | −1.9 | — | — | 3.5 | 9.7 |
| Ethanox ® 330<br>TIPA | 0.05<br>0.03 | −4.7 | −4.4 | — | −2.7 | 0.8 | 0.8 | 6.8 |
| Ethanox ® 330<br>TIPA | 0.1<br>0.01 | −4.8 | −4.4 | −1.5 | — | — | 3.5 | 10.2 |
| Ethanox ® 330<br>TIPA | 0.1<br>0.1 | −4.0 | −3.8 | — | −1.5 | 1.5 | 3.2 | 7.0 |

TABLE 7

| | | YELLOWNESS INDEX | | | | | | |
|---|---|---|---|---|---|---|---|---|
| | | Hours of Oven Aging at 90° C. | | | | | | |
| Additive | Wt. % | 0 | 24 | 168 | 192 | 408 | 500 | 1000 |
| Ethanox ® 330 | 0.05 | −4.2 | −2.4 | 5.0 | — | — | 14.9 | 24.5 |
| Ethanox ® 330 | 0.1 | −3.2 | −1.4 | 8.3 | — | — | 20.5 | 32.5 |
| Ethanox ® 330<br>TIPA | 0.05<br>0.005 | −4.6 | −4.0 | — | −1.5 | 3.1 | — | 12.9 |
| Ethanox ® 330<br>TIPA | 0.05<br>0.01 | −5.1 | −4.1 | −0.3 | — | — | 6.6 | 16.0 |
| Ethanox ® 330 | 0.05 | −4.6 | −2.7 | — | −0.5 | 2.2 | — | 8.3 |

TABLE 7-continued

| | | YELLOWNESS INDEX | | | | | | |
|---|---|---|---|---|---|---|---|---|
| | | Hours of Oven Aging at 90° C. | | | | | | |
| Additive | Wt. % | 0 | 24 | 168 | 192 | 408 | 500 | 1000 |
| TIPA | 0.03 | | | | | | | |
| Ethanox ® 330 | 0.1 | −4.9 | −4.2 | −0.5 | — | — | 6.9 | 16.5 |
| TIPA | 0.01 | | | | | | | |
| Ethanox ® 330 | 0.1 | −4.3 | −2.4 | — | 0.0 | 2.0 | — | 7.5 |
| TIPA | 0.1 | | | | | | | |

TABLE 8

| | | YELLOWNESS INDEX | | | | | | |
|---|---|---|---|---|---|---|---|---|
| | | Hours of Oven Aging at 70° C. | | | | | | |
| Additive | Wt. % | 0 | 24 | 168 | 192 | 408 | 500 | 1000 |
| Irganox ® 1010 | 0.1 | −4.4 | −3.3 | −1.5 | — | — | 1.0 | 3.8 |
| Irganox ® 1010 | 0.1 | −5.0 | −4.5 | −3.0 | — | — | −1.0 | 2.3 |
| TIPA | 0.01 | | | | | | | |
| Irganox ® 1010 | 0.05 | −4.4 | −3.7 | — | −1.1 | 1.8 | 2.8 | 5.2 |
| TIPA | 0.001 | | | | | | | |
| Goodrite 3114 | 0.05 | −4.4 | −3.5 | — | −1.6 | 3.3 | 3.8 | 7.5 |
| Goodrite 3114 | 0.05 | −4.4 | −4.6 | — | −3.1 | −1.4 | −0.6 | 1.4 |
| TIPA | 0.01 | | | | | | | |

TABLE 9

| | | YELLOWNESS INDEX | | | | | | |
|---|---|---|---|---|---|---|---|---|
| | | Hours of Oven Aging at 90° C. | | | | | | |
| Additive | Wt. % | 0 | 24 | 168 | 192 | 408 | 500 | 1000 |
| Irganox ® 1010 | 0.1 | −4.7 | −3.7 | −1.7 | — | — | 1.0 | 4.3 |
| Irganox ® 1010 | 0.1 | −4.7 | −4.2 | −2.8 | — | — | 0.5 | 4.3 |
| TIPA | 0.01 | | | | | | | |
| Irganox ® 1010 | 0.05 | −4.4 | −3.7 | — | −2.6 | −0.9 | — | 2.4 |
| TIPA | 0.01 | | | | | | | |
| Goodrite 3114 | 0.05 | −4.1 | −3.2 | — | −1.9 | −0.5 | — | 2.5 |
| Goodrite 3114 | 0.05 | −4.7 | −4.5 | — | −3.3 | −1.7 | — | 2.3 |
| TIPA | 0.01 | | | | | | | |

EXAMPLE 7

Ethanox ®330, 10 mg. and 2 mg. 4,4'-bipyridyl were dissolved in a small amount of methylene chloride which was then diluted with 30 grams reagent grade acetone. To this solution 20 grams of powdered LLDPE (Dowlex 2552, TM) was added and blended. The acetone was removed by evaporation and the stabilized LLDPE was compressed into a plaque of 59 mil thickness at 500° F. on a Pasadena hydraulic press. The plaque was oven aged at 90° C. and the yellowness index (YI) was measured as oven aging proceeded. For comparison, a similar plaque (60 mil thickness) with Ethanox ®330, but without the color preventer/suppressor was also oven aged. The comparative values are given in Table 10.

TABLE 10

| | Yellowness Index | |
|---|---|---|
| Hours of Oven Aging at 90° C. | 0.05% Ethanox ® 330 | 0.05% Ethanox ® 330 0.01% 4,4'-Bipyridyl |
| 0 | 9.5 | 1.8 |
| 24 | 8.6 | 3.2 |
| 120 | 11.8 | 5.3 |
| 216 | 16.2 | 6.7 |
| 480 | 25.2 | 14.7 |
| 648 | 26.8 | 16.7 |

EXAMPLE 8

Some initial testing of various phosphite antioxidants in some polyolefins containing trace quantities of amines gave mixed results with regard to color. Tests in other substrates gave conflicting results and it was not thought that the compounds could improve color. To our surprise, however, the addition of effective amounts of the compounds of the invention to antioxidant-protected, catalyst metal contaminated polymers gave very good results. The effective amounts for triisopropanolamine, for example, proved to be about a ten-fold increase over the amount which had been used in phosphites for the purpose of increasing their hydrolytic stability. The amount previously used is demonstrated below as ineffective.

In the same manner as Example 7, a 60 mil thick plaque was made using 10 mg. Ethanox®330 and 10 mg. Weston®619 (Borg-Warner) rather than 2 mg. 4,4'-bipyridyl. The Weston®619 is the phosphite antioxidant di(stearyl) pentaerythritol diphosphite containing about 1.0% triisopropanolamine. Thus, the first plaque of this example contains about 0.0005 weight percent triisopropanolamine.

A second plaque of 60 mil thickness was prepared in the same manner as the first plaque except Weston®618 was used in place of Weston®619. The Weston®618 contains only the diphosphite antioxidant without the triisopropanolamine. The comparative YI data in Table 11 shows that this level of color inhibitor is ineffective.

TABLE 11

| Hours of Oven Aging at 90° C. | Yellowness Index | |
|---|---|---|
| | 0.05% Ethanox ® 330 0.05% Weston ® 618* | 0.05% Ethanox ® 330 0.05% Weston ® 619** |
| 0 | 3.6 | 3.4 |
| 24 | 2.8 | 3.6 |
| 120 | 5.0 | 6.2 |
| 216 | 7.2 | 8.1 |

*does not contain triisopropanolamine
**contains about 1% triisopropanolamine (0.0005% of the LLDPE)

EXAMPLE 9

A 60 mil plaque was prepared and aged in the same manner as Example 1, from 100 mg. Ethanox®330 and 20 mg. N,N-bis-(2-hydroxyethyl)soyaamine from Armak Industrial Chemicals Co., a Division of Akzona, Inc. mostly $C_{18}H_{35}N-(C_2H_4OH)_2$ is marketed as Ethomeen S/12 (TM). The YI of this plaque was measured and the results are shown in Table 12.

TABLE 12

| Hours of Oven Aging at 90° C. | YI of 60 mil plaque with 0.05% Ethanox ® 330 0.01% Ethomeen S/12 (TM) |
|---|---|
| 0 | −4.2 |
| 48 | −2.8 |
| 144 | −0.3 |
| 300 | 2.3 |
| 500 | 6.0 |
| 720 | 9.2 |
| 1000 | 15.2 |

These values compare favorably with the 90° C. YI values of Table 1A.

EXAMPLE 10

It is known that passes through an extruder also tend to aggravate the color problem in polyolefins. This example shows the effect of the inventive composition and method on color stability.

In a nitrogen-inflated plastic bag were charged Exxon's LPX-2 LLDPE, Ethanox®330 antioxidant, and triisopropanolamine in the proportions indicated in Table 13. The bag of materials was shaken for about 60–90 seconds. The dry blends of these materials were then extrusion compounded in a Brabender Prep Center on a twin roller blade type screw. The temperature profile of the compounder was $Z-1=130°$ C.; $Z-2=245°$ C.; and $Z-3=245°$ C. The extruded product was water-quenched and pelletized. Thereafter the product was compression molded into 55 mil thick plaques at 375° F. prior to YI measurements. See Table 13.

TABLE 13

| LLDPE YI AFTER EXTRUSION | | |
|---|---|---|
| Ethanox ® 330 | Triisopropanolamine | YI |
| 0 | 0 | 8.6 |
| 0 | 75 ppm | 6.1 |
| 500 ppm | 0 | 15.0 |
| 500 | 0 | 14.8 |
| 500 | 0 | 13.2 |
| 500 | 0 | 15.4 |
| 500 | 5 | 13.9 |
| 500 | 5 | 14.6 |
| 500 | 5 | 15.0 |
| 500 | 15 | 9.5 |
| 500 | 25 | 8.6 |
| 500 | 50 | 9.0 |

Complete data for another polyolefin, UCC-1055, has not yet been obtained. However, the following information is available. UCC-1055 alone has a YI of 11.10 after the extrusion described above, whereas with 75 ppm triisopropanolamine added the YI is only 0.2. UCC-1055 with Ethanox®330 at 500 ppm test at YI's of 15.83, 16.07, and 16.95.

According to the invention, various polyolefins may be prepared in accordance with the process of the above examples. Alternatively, triisopropanolamine may be added to antioxidant-stabilized polyolefin powder in pellets and admixed by multiplepass extrusion. Certain aspects of the invention may be varied, such as the combination of antioxidant and polyolefin, without departing from the scope or spirit thereof as defined in the following claims.

We claim:

1. A composition of matter comprising:
   a major portion of a polyolefin containing residual catalyst metal contaminants causing discoloration in combination with a phenolic antioxidant in said polyolefin;
   a minor portion of a phenolic antioxidant protecting said polyolefin; and
   a bipyridine present in an amount effective to suppress and or prevent discoloration of the antioxidant protected, metal-contaminated polyolefin.

2. A composition of claim 1 wherein said compound is 2,2'-bipyridyl.

3. A composition of claim 1 wherein said compound is 4,4'-bipyridyl.

4. A composition of claim 1 wherein said antioxidant is selected from the group consisting of 1,3,5-trimethyl-2,4,6-tris(3',5'-di-tert-butyl-4'-hydroxybenzyl)benzene; tris(3,5-di-tert-butyl-4-hydroxybenzyl)isocyanurate, and tetrakis(methylene-3-[3',5'-di-tert-butyl-4'-hydroxyphenyl]-propionate)methane.

5. A composition of claim 1 wherein said polyolefin is selected from polypropylene, high density polyethylene, low density polyethylene, linear low density polyethylene, and polybutylene.

6. A composition of claim 5 wherein said polyolefin is polypropylene.

7. A composition of claim 1 wherein said antioxidant comprises about 0.01 to 0.2 weight percent of said polyolefin.

8. A composition of claim 1 wherein said effective amount comprises about 0.005 to 0.1 weight percent of said polyolefin.

9. A composition of matter comprising:

100 parts by weight linear low density polyethylene having a discoloration promoting amount of residual catalyst metal contaminants, about 0.05 to 0.2 part by weight 1,3,5-trimethyl-2,4,6-tris(3',5'-di-tert-butyl-4'-hydroxybenzyl)benzene; and about 0.005 to 0.1 part by weight of a bipyridine.

10. The composition of claim 9 wherein said compound is 4,4'-bipyridyl.

11. The composition of claim 9 wherein said compound is 2,2'-bipyridyl.

12. The composition of matter comprising about 1.0 part by weight phenolic antioxidant and about 0.025 to 1.0 part by weight of a bipyridine.

13. The composition of claim 12 wherein said phenolic antioxidant is tris(3',5'-di-tert-butyl-4'-hydroxybenzyl)isocyanurate.

14. The composition of claim 12 wherein said phenolic antioxidant is tetrakis(methylene-3-[3',5'-di-tert-butyl-4'-hydroxyphenyl]propionate)methane.

15. A method of preventing and/or suppressing discoloration in a catalyst metal contaminated, phenolic antioxidant-protected polyolefin, comprising admixing with said polyolefin a bipyridine in an amount effective to suppress and/or prevent discoloration of the antioxidant-protected polyolefin.

16. The method of claim 15 wherein about 0.005 to 0.2 part of said compound are admixed per 100 parts polyolefin.

17. The method of claim 15 wherein about 1 to 100 parts by weight of said compound are admixed per 100 parts phenolic antioxidant present in said polyolefin.

18. The method of claim 15 wherein said polyolefin is selected from the group consisting of polypropylene, high density polyethylene, low density polyethylene, linear low density polyethylene, and polybutylene.

19. The method of claim 15 wherein the antioxidant protecting said polyolefin is selected from 1,3,5-trimethyl-2,4,6-tris(3',5'-di-tert-butyl-4'-hydroxybenzyl)benzene; tris(3,5-di-tert-butyl-4-hydroxybenzyl)isocyanurate; and tetrakis(methylene-3-[3',5'-di-tert-butyl-4'-hydroxyphenyl]propionate)methane.

20. A method of preventing or suppressing yellowness is a catalyst metal contamined polyolefin otherwise tending to discolor with the addition of a protective antioxidant amount of 1,3,5-trimethyl-2,4,6-tris(3',5'-di-tert-butyl-4'-hydroxybenzyl) benzene, said method comprising also adding to said polyolefin a discoloration inhibiting portion of a bipyridine.

21. An article of manufacture formed from the composition of claim 1.

* * * * *

UNITED STATES PATENT AND TRADEMARK OFFICE
CERTIFICATE OF CORRECTION

PATENT NO. : 4,454,270
DATED : June 12, 1984
INVENTOR(S) : William Kolodchin et al.

It is certified that error appears in the above—identified patent and that said Letters Patent is hereby corrected as shown below:

Column 1, line 53, "falls" should read -- fails --;

Column 4, line 28, "tolune-generic" should read -- toluene-generic --;

Column 16, line 18, "is" should read -- in --.

Signed and Sealed this

Fifteenth Day of January 1985

[SEAL]

Attest:

GERALD J. MOSSINGHOFF

Attesting Officer

Commissioner of Patents and Trademarks